# United States Patent [19]

Duncan et al.

[11] 4,057,266
[45] Nov. 8, 1977

[54] COUPLING GUIDE FOR TRAILER HITCHES

[76] Inventors: Lee Holmes Duncan, Box 387, Sisters, Oreg. 97759; Lee Harold Duncan, 87749 MacKinzie Highway, Springfield, Oreg. 97477

[21] Appl. No.: 670,839

[22] Filed: Mar. 26, 1976

[51] Int. Cl.² .............................................. B60D 1/06
[52] U.S. Cl. .................................... 280/475; 280/477
[58] Field of Search .............. 280/477, 478 R, 478 A, 280/478 B, 482, 491 D, 491 R, 475

[56] References Cited

U.S. PATENT DOCUMENTS

| | | | |
|---|---|---|---|
| 1,923,904 | 8/1933 | Allen et al. | 280/482 |
| 2,451,660 | 10/1948 | Clark et al. | 280/478 R |
| 3,326,573 | 6/1967 | Neitzey | 280/482 |
| 3,397,900 | 8/1968 | Sturges | 280/478 R |
| 3,820,822 | 6/1974 | Henderson | 280/478 A |

Primary Examiner—Joseph F. Peters, Jr.
Assistant Examiner—John A. Pekar
Attorney, Agent, or Firm—Oliver D. Olson

[57] ABSTRACT

An elongated bar is mounted on a trailer tongue for longitudinal sliding and lateral pivoting movement relative thereto, the forward end of the bar providing releasable engagement with a trailer hitch ball component on a tow vehicle. In one embodiment the forward end of the bar has a centering notch arranged to engage the stem of the hitch ball, the bar underlying the companion hitch socket component on the trailer tongue. In another embodiment the forward end of the bar is provided with the socket component of a trailer hitch for engagement with the companion ball component on a tow vehicle. The rearward end of the bar is connected to a pair of restraining chains or rods which are connected to laterally spaced terminals on the tongue, such that the chains or rods limit the rearward, forward and lateral movement of the bar. An elongated cable, wound on a spring-retractable reel in a cable housing secured to the bar just rearwardly of the centering notch or hitch component, is provided with a loop at its outer end for slipping freely over the hitch ball component on the tow vehicle, the tensioned cable thereby swinging the bar into alignment with the hitch ball component on the tow vehicle and maintaining said alignment as the tow vehicle is moved to bring the hitch ball and socket components together.

15 Claims, 11 Drawing Figures

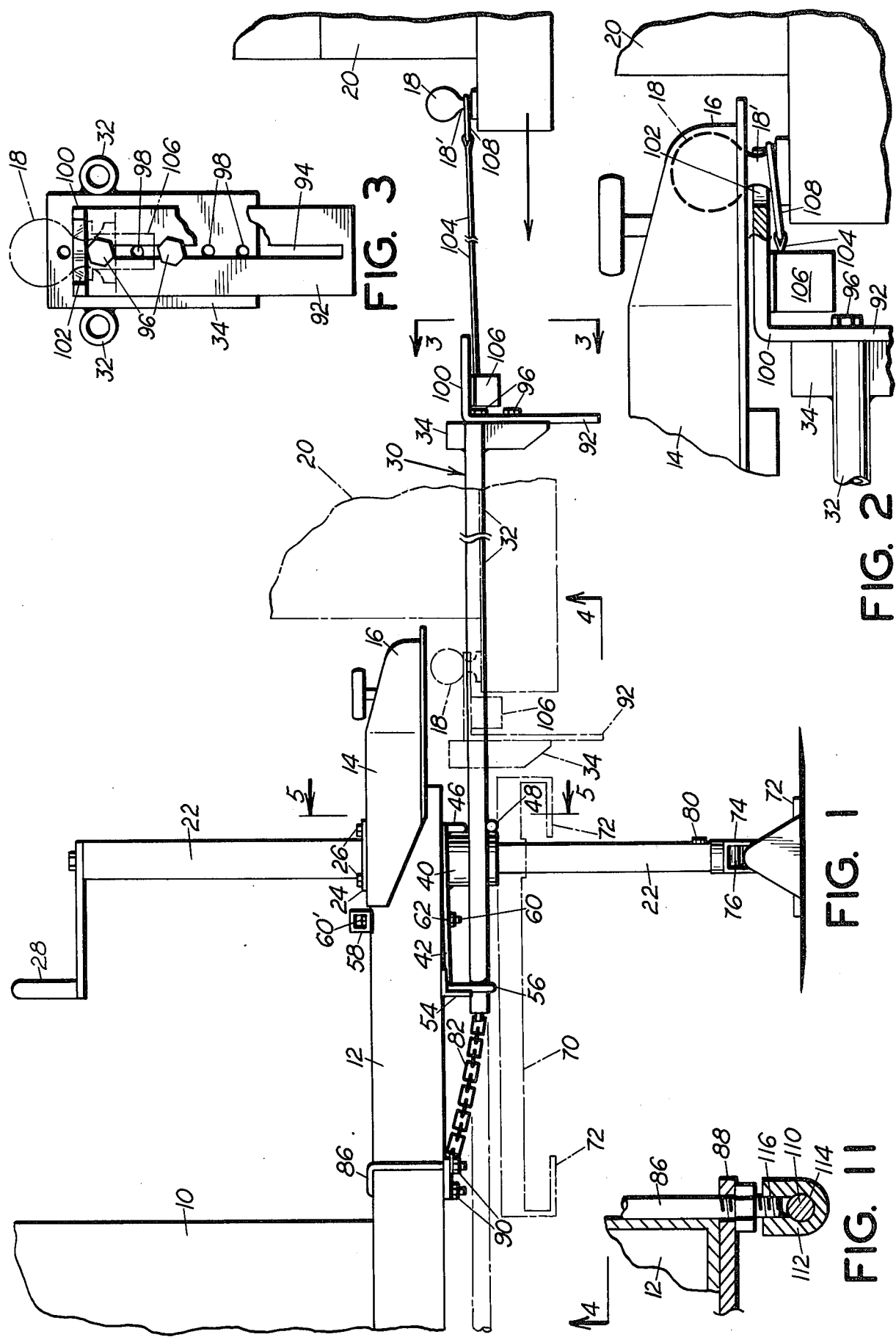

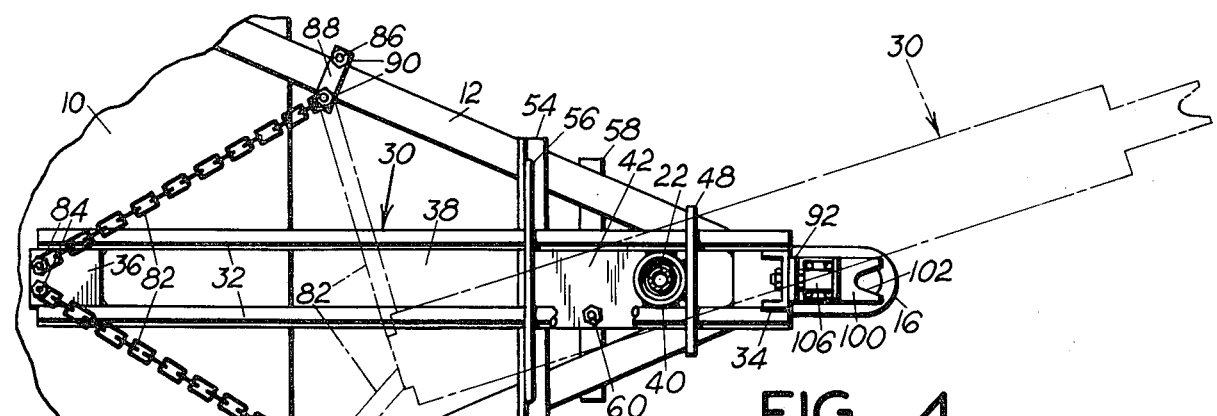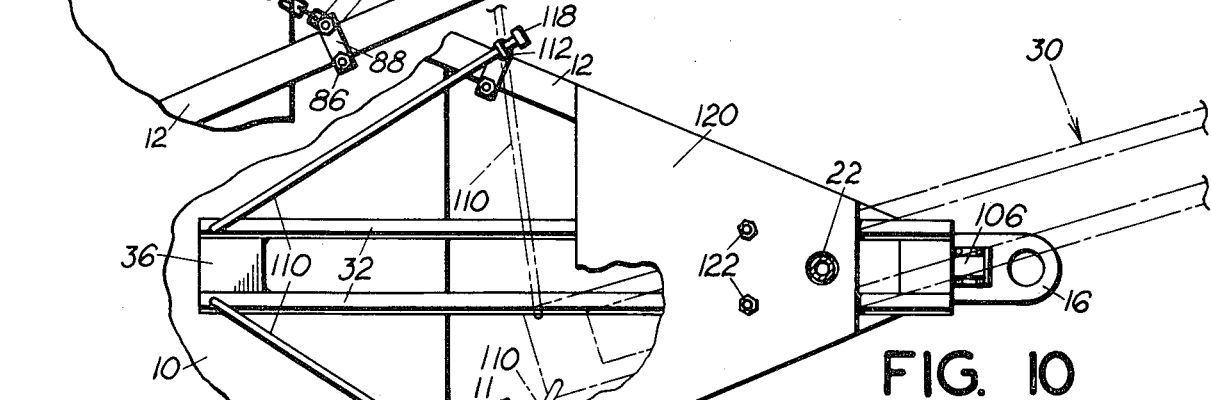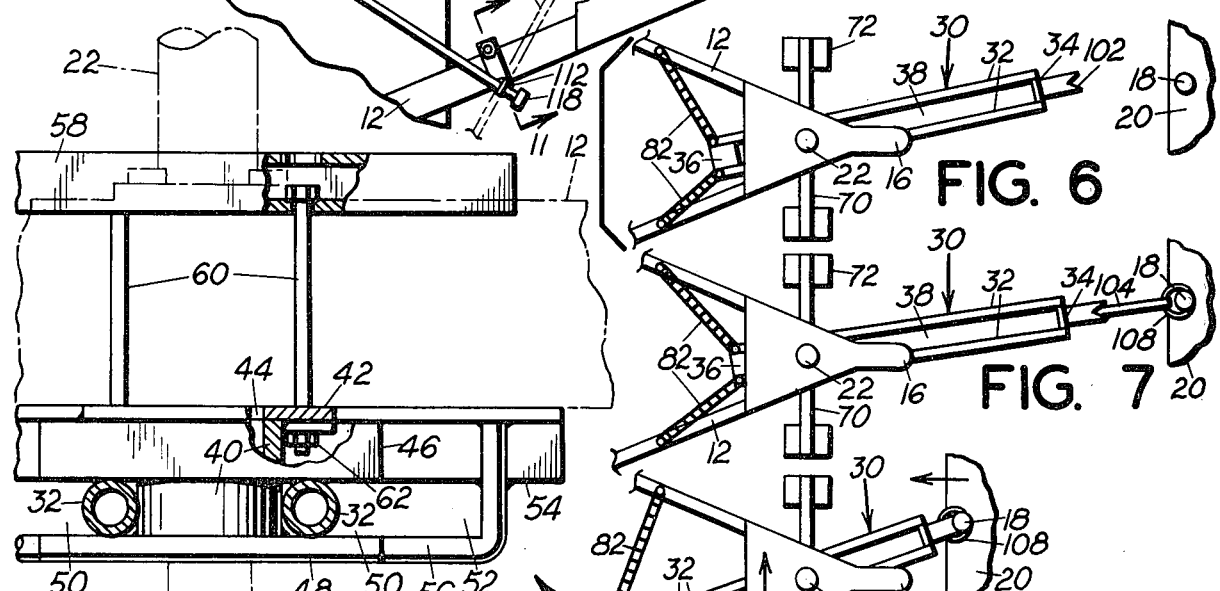

COUPLING GUIDE FOR TRAILER HITCHES

BACKGROUND OF THE INVENTION

This invention relates to trailer hitches, and more particularly to means by which the ball and socket or equivalent components of the trailer hitch are guided automatically into registry.

Various types of devices have been provided heretofore for guiding trailer hitch components into registry. They are characterized by complex and costly structures which form integral parts of trailer tongues, forming permanent parts of the latter. Their addition to existing trailer tongues thus is economically unfeasible. Moreover, they are operable only within a short distance, requiring that the tow vehicle be positioned quite close to the trailer tongue in the first instance, thereby increasing the time requirement for bringing the hitch components into coupling engagement.

SUMMARY OF THE INVENTION

In its basic concept, the trailer hitch coupling guide of this invention utilizes an elongated bar movable longitudinally and laterally relative to a trailer tongue within limits restrained by a pair of flexible lines or rods which extend from the rearward end of the bar to opposite, lateral anchor terminals fixed relative to the tongue.

It is by virtue of the foregoing basic concept that the principal objective of this invention is achieved; namely, to overcome the disadvantages and limitations of prior art hitch coupling devices.

Another important object of this invention is the provision of a trailer hitch coupling guide of the class described which is capable of attachment to and detachment from existing trailer tongues, with speed and facility.

Still another important objective of this invention is the provision of a trailer hitch coupling guide of the class described which affords automatic alignment of the trailer hitch components through a considerable initial spacing between the trailer tongue and a tow vehicle.

A further objective of this invention is the provision of a trailer hitch coupling guide of the class described which is of simplified and therefore economical construction, requiring minimum maintenance and repair.

The foregoing and other objects and advantages of this invention will appear from the following detailed description, taken in connection with the accompanying drawings of preferred embodiments.

BRIEF DESCRIPTION OF THE DRAWINGS

FIG. 1 is a fragmentary side elevation of a conventional trailer house tongue assembly having installed thereon a coupling guide embodying the features of this invention, the coupling guide being shown extended in full lines and retracted in broken lines to a position of uncoupled registration of the ball and socket trailer hitch components.

FIG. 2 is a fragmentary side elevation showing the retracted position of FIG. 1 with the socket component of the hitch lowered into coupling engagement with the ball component.

FIG. 3 is a front elevation taken on the line 3—3 in FIG. 1, parts being broken away and others shown in broken lines for clarity.

FIG. 4 is a fragmentary bottom plan view taken on the line 4—4 in FIG. 1, the guide bar being shown retracted in full lines and extended in broken lines.

FIG. 5 is a fragmentary vertical section taken on the 5—5 in FIG. 1.

FIGS. 6—9 inclusive, are fragmentary plan views showing a sequence of steps involved in guiding the ball and socket hitch components into registry.

FIG. 10 is a fragmentary bottom plan view, similar to FIG. 4, showing another embodiment of this invention.

FIG. 11 is a fragmentary sectional view taken on the line 11—11 in FIG. 10.

DESCRIPTION OF THE PREFERRED EMBODIMENTS

The coupling guide of this invention is illutrated in the drawings in association with a trailer tongue projecting forwardly of the trailer house 10. The tongue is formed of a pair of box beams 12 which converge forwardly and merge with a forwardly extending center portion 14 which includes at its terminal end the socket component 16 of a conventional ball and socket trailer hitch. The ball component 18 of the hitch is shown mounted on the rear end of a two vehicle 20, the ball being mounted at the upper end of a stem 18' of much smaller diameter.

Most trailer houses are provided with a leveling jack 22 associated with the tongue. Such a jack is illustrated in the drawings, extending vertically through the forward extension 14 and secured thereto by a mounting plate 24 and bolts 26. The upper end of the jack illustrated is provided with a hand crank 28. The lower end of the jack ordinarily is provided with an enlarged foot for providing stable ground support. However, such a foot is replaced in the drawings by a special base described more fully hereinafter.

The embodiment of the coupling device of this installation illustrated in FIGS. 1-9 is attachable to and detachable from the trailer tongue. For this purpose it includes an elongated bar 30, in the form of a pair of laterally spaced structural tubes 32 secured together in said spaced relationship by means of a front, channel-shaped spacer 34 and a rear spacer plate 36. The central longitudinal slot 38 formed between the tubes and the front and rear spacers receives freely therethrough a downwardly projecting hollow sleeve 40 which is secured to and projects downwardly from the underside of a bar-supporting base plate 42, the latter being provided with an opening 44 coaxial with the sleeve, for purposes described more fully hereinafter.

The forward end of the base plate terminates adjacent the sleeve. A pair of vertically spaced guide members 46 and 48 are secured to the forward side of the sleeve, under the base plate, and provide between them a pair of laterally spaced guide slots 50 which slidably receive the laterally spaced tubes 32 between them.

At the rearward end of the base plate 42 there is secured a transverse guide member forming a transverse slot 52, closed at its lateral ends, for freely receiving the tubes 32 and limiting their extent of lateral swinging movement, as described hereinafter. In the embodiment illustrated, said transverse guide member is provided by a transversely elongated angle iron 54 welded or otherwise secured to the rearward end of the base plate, and a U-shaped rod 56 welded or otherwise secured at its laterally spaced ends to the ends to the angle iron. The legs of the U-shaped rod are longer than the adjacent flange of the angel iron, whereby a transversely elongated slot 52 is provided between the lower edge of the angel iron and the laterally extending portion of the U-shaped rod.

From the foregoing it will be appreciated that the base plate 42 functions through the front and rear guide slots 50 and 52, respectively, to support the elongated bar tubes 32 for longitudinal sliding movement relative thereto and for lateral swinging moement pivotally about the sleeve 40 as a pivot axis.

Means is provided for securing the base plate 42 detachably to the trailer tongue. In the embodiment illustrated, the transverse angle iron 54 has a length sufficient to span the forwardly coverging box beams 12 of the trailer tongue, on the underside thereof, and a transversely elongated clamping bar 58, in the form of a square tubing, also is arranged to span the coverging box beams on the upper side thereof and forwardly of the angle iron. A pair of elongated bolts 60 extend through openings in the clamp bar and through registering openings in the base plate, whereupon nuts 62 are threaded onto the projecting ends of the bolts and tightened to clamp the base plate 42 to the trailer tongue 12 on the underside thereof.

With reference to FIG. 5, it is to be noted that the clamp bar 58 of square tubing is provided with a pair of registering openings for each of the clamp bolts. One of the openings 64 is larger than the head 60' of the bolt 60, while the other openings 66 is smaller than the head of the bolt. In the illustrated form, the clamp bar is disposed with the larger of said openings facing upward and the clamp bolt is extended downward therethrough so that the head of the bolt is passed through the larger opening and abuts the inner side of he square tubing. This arrangement accommodates the clamping of the base plate 42 to a trailer tongue formed of beams 12 having a predetermined vertical thickness, for example 4 inches. In the event the beams are of lesser thickness, for example 3inches, the clamp bar 58 is rotated 180° from the position illustrated in FIG. 5, whereupon the head of the bolt abuts the outer side of the smaller opening 66 and extends downward through the larger opening 64 and thence through the base plate. The vertical thickness of the square tube, being for example 1 inch, thus compensates for the 1 inch lesser thickness of the tongue beams.

The clamping mechanism described allows adjustment of the bar-supporting base 42 relative to the tongue, so as to align the sleeve 40 with the vertical jack 22, as will be apparent.

Inasmuch as operation of the coupling guide of this invention involves the lateral movement of the trailer tongue, as described hereinafter, it is necessary that the jack 22 have a ground support which allows the jack to move laterally with the tongue. Such a support is provided in accordance with this invention, In the embodiment illustrated and best shown in FIG. 5, it includes an elongated base beam 70 in the form of a cylindrical tube, provided at its opposite ends with elevating pads 72 by which to elevate the beam above ground support. A sleeve 74 encircles the beam freely for movement along the latter. The upper portion of the sleeve is provided with a contact block 76 of nylon or other suitable material habing a low coefficient of friction, whereby to enable movement of the sleeve along the beam with a minimum of frictional resistance.

The sleeve 74 functions to connect the lower end of the jack to the supporting beam 70, and this connection is made pivotal by means of a threaded pivot shaft 78 which engages an internally threaded connector on the sleeve. The opposite end of the shaft is threaded into an internally threaded socket in the bottom end of the jack, and the connection is made secure by such means as the set screw 80 illustrated.

Simplified means is provided for restraining the longitudinal and lateral movement of the elongated bar 30 relative to the trailer tongue, and also to locate the bar at its limit of rearward movement on the longitudinal centerline of the tongue. In the embodiment illustrated in FIGS. 1–9, this restraining means comprises a pair of elongated flexible lines. Although the lines may be flexible rope, or cable, they preferably are provided as lengths of chain 82. The rearward end of each chain is secured to the rearward end of the elongated bar, as by means of bolts 84 anchored in the rear spacer plate 36.

The forward ends of the chains are connected to laterally spaced terminals fixed relative to the tongue and located on opposite sides of the longitudinal centerline of the tongue. Since the embodiment illustrated is adapted for detachable connection to a conventional trailer tongue, detachable means are provided for connecting the forward ends of the chains to the converging beams 12 of the tongue. Each of these is provided by means of U-shaped clamp rods 86 which straddles the beams laterally to opposite sides of the bar. A perforated clamp plate 88 receives the spaced ends of the clamp rod to traverse the side of the beam opposite the closed, intermediate portion of the clamp rod, and clamping nuts 90 then are threaded onto the projecting threaded ends of a clamp rod to secure the latter to the beam. The forward terminal link of each chain 82 is slipped over one projecting end of the clamp rod to secure the latter to the beam. The forward terminal link of each chain 82 is slipped over one projecting end of the clamp rod before the nut 90 is applied. Accordingly, the forward ends of the chains are secured detachably to laterally spaced terminals which are fixed relative to the tongue.

In the illustrated arrangement, the terminals are directly on the tongue beams 12. However, the terminals may be provided, for example, by lateral extensions of the angle iron 54 or other integral component of the base plate 42, as will be understood.

The lengths of the chains 82 and the lateral terminal positions are selected to limit the movement of the elongated bar 30 primarily to limits of longitudinal extension and retraction relative to the trailer tongue, and secondarily to limits of lateral swinging or pivotal movement, as described in detail hereinafter.

The elongated bar 30 is provided at its forward end with connector means for engaging the ball component 18 on the tow vehicle, whereby subsequent rearward backing movement of the tow vehicle results in lateral swinging of the trailer tongue to bring the socket component 16 thereon into registry with the ball component. In the embodiment illustrated in FIGS. 1–9, the forward portion of the elongated bar is formed as a separate extension of the spaced tubes. Further, it is connected to the rearward portion of the bar in a manner to allow relative vertical displacement of the two portions in order to accommodate lowering and raising of the socket component of the hitch relative to the ball component during coupling and uncoupling thereof, as described hereinafter.

In the embodiment illustrated, the forward end portion of the bar 30 is provided in the form of an L-shaped member the vertical section 92 of which slidably abuts the forward outer surface of the channel-shaped spacer 34. An elongated vertical slot 94 (FIG. 3) in said vertical section receives freely therethrough a pair of guide bolts 96 which are supported in a selected pair of a plurality of vertically spaced threaded holes 98 in the spacer. The horizontal section 100 extends forward of the spacer 34 and is provided at its forward end with a notch 102 proportioned to engage the stem portion 18' of the ball component mounted on the tow vehicle. Preferably, the notch is V-shaped with the walls thereof converging rearwardly, to facilitate its engagement with the stem.

It is to be noted, by a comparison of FIGS. 1 and 2 of the drawings, that the horizontal section 100 of the forward portion of the bar assumes a normal vertical position relative to the rearward portion by its abutment with the upper one of the pair of guide bolts 96 (FIG. 1). Changes in this normal vertical position of the horizontal section 100, by anchoring the upper bolt 96 in a desired one of the spaced holes 98, accommodate variations in vertical movement of the socket component 16 during coupling to and uncoupling from the ball component 18.

After engagement of the notch 102 with the ball stem and movement of the ball rearward into vertical registration with the socket component (broken lines in FIG. 1), manipulation of the jack 22 to lower the socket component 16 onto the ball 18 (FIG. 2) results in downward movement of the rearward portion 30 of the bar relative to its forward section. Accordingly, it is apparent that the vertically movable forward section accommodates coupling and uncoupling of the trailer hitch components while maintaining the notch in engagement with the ball stem.

It is also to be noted that in the position of vertical registration of the ball and socket components of the hitch, and with the notch in engagement with the ball stem, as illustrated in full lines in FIG. 4, the elongated bar 30 is restrained by the chains 82 in its position of maximum rearward retraction relative to the tongue. In this position the pair of chains also functions to locate the rearward end of the elongated bar on the longitudinal centerline of the tongue. Since the socket component of the hitch also is located on the longitudinal center line of the tongue, as is the axis of the vertically adjustable jack, about which axis the elongated bar 30 swings in pivotal movement, the notch at the forward end of the bar is brought into vertical registration with the socket component of the hitch.

Means preferably is provided for aligning the notch 102 with the vertical axis of the ball 18 and stem 18', while the tow vehicle 20 is positioned a considerable distance from the trailer tongue. In the embodiment illustrated, this is provided by means of an elongated line 104 which is mounted on a spring retractable reel within a housing 106 secured to the underside of the horizontal section 100 of the forward portion of the elongated bar 30, just rearwardly of the notch. The forward end of the line, which may be a cable made of flexible metal, synthetic resin or other suitable material, is provided at its forward end with a loop 108, either closed in the form of a ring, or open in the form of a hook, dimensioned to engage the stem 18' of the ball component. If the loop is of the closed ring type, as illustrated, it will be understood that it must be sufficiently large to slip freely over the ball 18.

The retracting tension applied to the line 104 is sufficient to cause the elongated bar 30 to be pulled forwardly and swung laterally to bring the notch 102 into alignment with the ball 18. This tension is maintained on the line as the tow vehicle 20 is moved rearward toward the trailer tongue until the stem of the ball enters the notch.

In the absence of the alignment line 104, the tow vehicle must be moved rearward to a position closely adjacent the trailer tongue, whereupon the operator may manually pull the elongated bar 30 forwardly and swing it laterally to bring the notch into engagement with the stem of the ball.

The operation of the coupling guide illustrated in FIGS. 1-9 and described hereinbefore, is as follows: First, with the trailer house 10 still coupled to the two vehicle 20 and moved to the location where uncoupling is desired, the jack 22 is adjusted vertically so that the support beam pads 72 engage the ground support. The socket component of the hitch then is released from engagement with the ball component, and the jack then is manipulated to elevate the trailer tongue and socket component of the hitch so that the latter clears the ball component (broken lines in FIG. 1). Notation is made of this elevation of the socket component above ground support, so that it may be returned to this position when recoupling of the hitch components is desired. The loop 108 on the guide cable 104 then is removed from engagement with the ball component, whereupon the cable retracts fully within its housing 106, and the tow vehicle moved away. The jack then is readjusted to bring the trailer house 10 to desired level condition.

When it is next desired to couple the trailer hitch components, the tow vehicle 20 is backed into the vicinity of the trailer house 10 and to a position of approximate longitudinal alignment with the latter (FIG. 6). The operator then leaves the tow vehicle, walks back to the trailer tongue, grasps the ring 108 on the end of the alignment line 104 and pulls it forward to the tow vehicle where he loops it over the ball component 18, as illustrated in full lines in FIG. 1. In this condition the elongated alignment bar 30 is pulled forwardly to its maximum extension and swung laterally about the pivot axis of the sleeve 40, to bring it into longitudinal alignment with the alignment line 104 (FIG. 7).

The operator then returns to the tow vehicle and backs it toward the trailer tongue on a path of approximately alignment with the latter, until the stem 18' of the ball engages the notch 102 in the forward end of the bar. Continued rearward movement of the tow vehicle then causes the alignment bar to retract, for example to the position illustrated in FIG. 8, wherein one of the restraining chains is stretched to its full length. Further rearward movement of the tow vehicle, and consequent further rearward movement of the bar 30, causes the latter to be swung in the direction of the arrow in FIG. 8. Since the notch at the forward end of the bar is engaged with the stem of the ball on the tow vehicle, and since the latter is still moving rearward toward but offset laterally from the longitudinal centerline of the tongue, the tongue is caused to be moved laterally. This is accommodated by the sliding contact of the lower end of the jack 22 with the jack support beam 70 which is positioned on a line substantially normal to the longitudinal centerline of the tongue.

The tow vehicle is moved rearward until both of the restraining chains 82 are tensioned. In this position (FIG. 9) the tongue has been swung laterally by corresponding slight pivoting of the trailer house 10, and the elongated bar 30 has been swung into alignment with the longitudinal centerline of the tongue, and the socket component 16 on the latter has been brought into vertical registration with the ball component 18 on the tow vehicle.

The operator then leaves the tow vehicle and manipulates the jack 22 so as to lower the socket component 16 onto the underlying, registering ball component. During this lowering of the socket component, and hence the trailer tongue, the forward portion of the alignment bar 30 remains in its relative horizontal position since the notch 102 therein is still engaged with the stem of the ball component. Accordingly, the rearward portion of the alignment bar 30 lowers with the tongue (FIG. 5), such lowering being accommodated by the sliding interengagement at the guide bolts 96. The clamping mechanism associated with the socket component 16 then is manipulated to clamp the ball and socket components together.

With the trailer tongue thus supported by the tow vehicle, the jack 22 is manipulated to elevate its lower end upward from the ground support illustrated in FIG. 1. The jack supporting beam 70 and its integral elevating pads 72 is rotated 180° from the position illustrated in FIG. 1 to bring the pads to an upwardly facing position. The beam 70 then is rotated 90° into alignment with the longitudinal axis of the elongated alignment bar 30. The jack then is elevated further until the forwardly facing pad 72 is brought into engagement with the underside of the elongated bar 30 and in abutment with the bottom transverse guide member 48, as illustrated in broken lines in FIG. 1. The jack support beam assembly thus is secured in transport position.

Referring now to FIGS. 10 and 11, the embodiment illustrated therein differs from the embodiment of FIGS. 1-9 in that the alignment bar 30 is provided as a one-piece, rigid unit incorporating at its forward end the socket component 16 of a conventional ball and socket trailer hitch. Further, the restraining chains 82 of the earlier described embodiment are replaced by a pair of elongated rods 110. One end of each rod, the rearward end illustrated in FIG. 10, is connected pivotally to the rearward end plate 36 of the alignment bar. The other end, the forward end illustrated, extends slidably through a transversely apertured pivot member 112 located at the lateral terminals described hereinbefore. As best shown in FIG. 11, the pivot member is provided with a transverse opening 114 slidably receiving the rod 110. A threaded bore 116 in the pivot member, disposed perpendicular to the opening 114, engages the threaded extension of one leg of the U-shaped clamp rod 86 previously described. The adjacent terminal end of the rod is provided with an enlarged head 118, provided by means of a threaded nut, a cotter pin, or other suitable means, to prevent rearward retraction of the rod through the transverse opening 114 of the pivot member.

The elongated alignment bar 30 is provided with the central elongated slot 38, as previously described for reception of the adjustment jack 22, and it is confined between vertical plates 120 secured to the converging beams 12 of the trailer tongue.

When the alignment bar is in its position of rearwardmost retraction, illustrated in FIG. 10, wherein it is aligned with the longitudinal centerline of the trailer tongue, one or more locking bolts 122 are extended through registering openings in the bar and its confining plates 120, to secure the bar and hence the socket component 16 of the trailer hitch, against displacement, since it is in this position that the trailer hitch components are coupled together for transporting the trailer.

From the foregoing, it will be appreciated that the present invention provides a trailer hitch coupling guide which is adaptable either for permanent integration with a conventional trailer tongue, or for attachment to and detachment from a variety of types of conventional trailer tongues with speed and facility. It accommodates conventional operation of the usual adjustable leveling jack, the latter merely being provided with a special supporting base which allows lateral swinging movement of the trailer tongue as required to bring initially offset trailer hitch components into vertical registry. Further, it provides for interconnecting a trailer tongue and a tow vehicle at substantial distances of separation, whereby to expedite the ultimate coupling of hitch components. Further, it accommodates the coupling and uncoupling of conventional ball and socket hitch components without the necessity of first disengaging the coupling guide from the ball component. These and other features are provided, moreover, by a coupling guide of simplified construction which affords economical manufacture and minimum maintenance.

It will be apparent to those skilled in the art that various changes may be made in the size, shape, type, number and arrangement of parts described hereinbefore. For example, the restraining chains and rods may be interchanged on the embodiments illustrated. The restraining rods 110 of FIG. 10 may be connected pivotally at the laterally outward ends and the pivot members 112 located at the rearward end of the elongated alignment bar 30. Although the trailer tongue is illustrated in association with a trailer house, it is to be understood that the trailer tongue may be a component of a conventional tow bar by which one vehicle is towed by another. These and other modifications and changes may be made, as desired, without departing from the spirit of this invention.

Having now described our invention and the manner in which it may be used, we claim:

1. A coupling guide for bringing into registry a hitch component carried by a tow vehicle and a companion hitch component carried by a trailer tongue, the coupling guide comprising
    a. an elongated bar mounted on the trailer tongue for longitudinal and lateral swinging movement relative to the tongue,
    b. a pair of elongated restraining members connected at one of their ends to the rearward end of the bar and at the other of their ends to laterally spaced terminals fixed relative to the tongue and located outwardly of the bar on opposite sides of the longitudinal centerline of the tongue, for limiting said longitudinal and lateral movement of the bar and operable to locate the bar at its limit of rearward movement on the longitudinal center line of the tongue, and
    c. connector means on the forward end of the bar for engaging a hitch component on a tow vehicle.

2. The coupling guide of claim 1 wherein the connector means comprises a hitch component.

3. The coupling guide of claim 1 wherein the hitch component carried by the trailer tongue is secured integrally thereto and the coupling guide includes a base slidably supporting the bar for longitudinal and lateral swinging movement relative thereto, and attaching means engaging the base for securing the latter to a trailer tongue.

4. The coupling guide of claim 3 wherein the attaching means comprises clamp means for detachably securing the bar-supporting base to a trailer tongue against relative rotation.

5. The coupling guide of claim 3 wherein said laterally spaced terminals comprise attachment means connected to the said other end of each of said restraining means and arranged for detachable connection to laterally spaced portions of the trailer tongue.

6. A coupling guide for bringing into registry a hitch component carried by a tow vehicle and a companion hitch component carried by a trailer tongue, the coupling guide comprising:
   a. an elongated bar mounted on the trailer tongue for longitudinal and lateral swinging movement relative to the tongue,
   b. a pair of elongated flexible lines connected at one of their ends to the rearward end of the bar and at the other of their ends to laterally spaced terminals fixed relative to the tongue and located on opposite sides of the longitudinal centerline of the tongue, and
   c. connector means on the forward end of the bar for engaging a hitch component on a tow vehicle.

7. The coupling guide of claim 6 wherein the flexible lines are lengths of chain.

8. A coupling guide for bringing into registry a hitch component carried by a tow vehicle and a companion hitch component carried by a trailer tongue, the coupling guide comprising:
   a. an elongatd bar mounted on the trailer tongue for longitudinal and lateral swinging movement relative to the tongue,
   b. a pair of elongated restraining members connected at one of their ends to the rearward end of the bar and at the other of their ends to laterally spaced terminals fixed relative to the tongue and located on opposite sides of the longitudinal centerline of the tongue, the restraining members comprising a pair of rods pivotally secured at one of their ends to one of said bar or terminals and slidably and pivotally connected to the other of their ends to the other of said bar or terminals, and
   c. connector means on the forward end of the bar for engaging a hitch component on a tow vehicle.

9. The coupling guide of claim 8 wherein each rod is secured at one end pivotally to the rearward end of the bar, an apertured pivot member is secured to each terminal, and each rod extends slidably one through each of said aperture pivot members, and the outer end of each rod includes enlarged head means for preventing passage of said outer end through the aperture pivot member.

10. A coupling guide for bringing into registry a hitch component carried by a tow vehicle and a companion hitch component carried by a trailer tongue, wherein the hitch component carried by the trailer tongue is secured integrally thereto and the trailer tongue mounts an adjustable jack for supporting the forward end of a trailer, the coupling guide comprising:
   a. an elongated bar mounted on the trailer tongue for longitudinal and lateral swinging movement relative to the tongue,
   b. a base slidably supporting the bar for longitudinal and lateral swinging movement relative thereto, the base having an opening therethrough for the reception of said adjustable jack,
   c. attaching means engaging the base for securing the latter to the trailer tongue,
   d. a jack base for supporting the bottom end of the jack, the jack base including an elongated beam having elevating pads at its opposite ends for elevating the beam above the ground support.
   e. a jack connector mounted on the beam for movement along the latter,
   f. pivotal attachment means on the jack connector for connecting the bottom end of the jack to the jack connector,
   g. a pair of elongated restraining members connected at one of their ends to the rearward end of the bar and at the other of their ends to laterally spaced terminals fixed relative to the tongue and located on opposite sides of the longitudinal centerline of the tongue, and
   h. connector means on the forward end of the bar for engaging a hitch component on a tow vehicle.

11. The coupling guide of claim 10 including a hollow sleeve on the bar-supporting base concentric with said opening therethrough, the bar having an elongated longitudinal slot receiving said sleeve, whereby the bar is pivotable about the axis of said sleeve.

12. A coupling guide for bringing into registry a hitch component carried by a tow vehicle and a companion hitch component carried by a tongue, wherein the hitch component carried by the tow vehicle is a ball on the upper end of a stem secured to the tow vehicle, and the hitch component carried by the tongue is a socket member arranged to seat releasably over said ball, the coupling guide comprising:
   a. an elongatd bar mounted on the trailer tongue for longitudinal and lateral swinging movement relative to the tongue,
   b. a base slidably supporting the bar for longitudinal and lateral swinging movement relative thereto,
   c. attaching means engaging the base for securing the latter to the trailer tongue, the attaching means disposing the bar in a plane underlying the hitch component on the trailer tongue,
   d. a pair of elongated restraining members connected at one of their ends to the rearward end of the bar and at the other of their ends to laterally spaced terminals fixed relative to the tongue and located on opposite sides of the longitudinal centerline of the tongue, and
   e. connector means on the forward end of the bar for engaging the hitch component on the tow vehicle, the connector means comprising a notch in the forward end of the bar arranged to engage the stem of the ball component of the trailer hitch.

13. The coupling guide of claim 12 wherein the bar includes a forward portion movable vertically relative to the rearward portion, the forward end of the forward portion including said notch.

14. A coupling guide for bringing into registry a hitch component carried by a tow vehicle and a companion hitch component carried by a trailer tongue, the coupling guide comprising:
   a. an elongated bar mounted on the trailer tongue for longitudinal and lateral swinging movement relative to the tongue,
   b. a pair of elongated restraining members connected at one of their ends to the rearward end of the bar and at the other of the ends to laterally spaced terminals fixed relative to the tongue and located on opposite sides of the longitudinal centerline of the tongue, c. connector means on the forward end of the bar for engaging a hitch component on a tow vehicle, and d. a retractable reel secured to the forward end portion of the bar rearwardly of said connector means and mounting an elongated flexible alignment line arranged to be extended from the reel and to be attached at its outer end releasably to a tow vehicle on the vertical axis of the hitch component carried thereby, the reel including means for tensioning the line in the retracting direction sufficient to cause the bar to be extended and swung laterally into alignment with the hitch component on the tow vehicle.

15. The coupling guide of claim 14 including loop means on the forward end of the alignment line for releasably engaging a hitch component on a tow vehicle.

* * * * *